United States Patent [19]

Blood et al.

[11] 4,089,383

[45] May 16, 1978

[54] POWER DRIVEN CENTERLINE STEERING SAFETY AXLE WHEEL ASSEMBLY WITH DISC BRAKE

[75] Inventors: John D. Blood; Melvin R. Inbody, both of Findlay, Ohio

[73] Assignee: The Centerline Steering Safety Axle Corporation, Findlay, Ohio

[21] Appl. No.: 727,874

[22] Filed: Sep. 29, 1976

[51] Int. Cl.² ............................................... B62D 7/08
[52] U.S. Cl. .................................. 180/43 R; 180/48; 280/96.3; 188/18 A
[58] Field of Search ........................... 280/96.3, 96.1; 180/43 R, 43 B, 43 C, 42, 46, 47, 48, 43 A; 188/18 A, 71.1

[56] References Cited

U.S. PATENT DOCUMENTS

| | | | |
|---|---|---|---|
| 2,220,254 | 11/1940 | Maier | 180/43 R X |
| 2,346,143 | 4/1944 | Asam | 180/43 A |
| 2,548,356 | 4/1951 | Enos | 180/43 A |
| 2,817,407 | 12/1957 | Kost et al. | 280/96.3 X |
| 3,788,429 | 1/1974 | Brooks et al. | 188/71 A |
| 3,963,260 | 6/1976 | Inbody | 188/18 A X |

*Primary Examiner*—Kenneth H. Betts
*Attorney, Agent, or Firm*—Laverne D. Geiger

[57] ABSTRACT

A wheel drive system for a surface vehicle has a dirigible wheel with its steering axis on the vertical center line of the wheel, a disc brake with annular braking surfaces in vertical planes adjacent to the center line, caliper type brake shoes to engage the surfaces, and power driven gears for driving the wheel.

5 Claims, 6 Drawing Figures

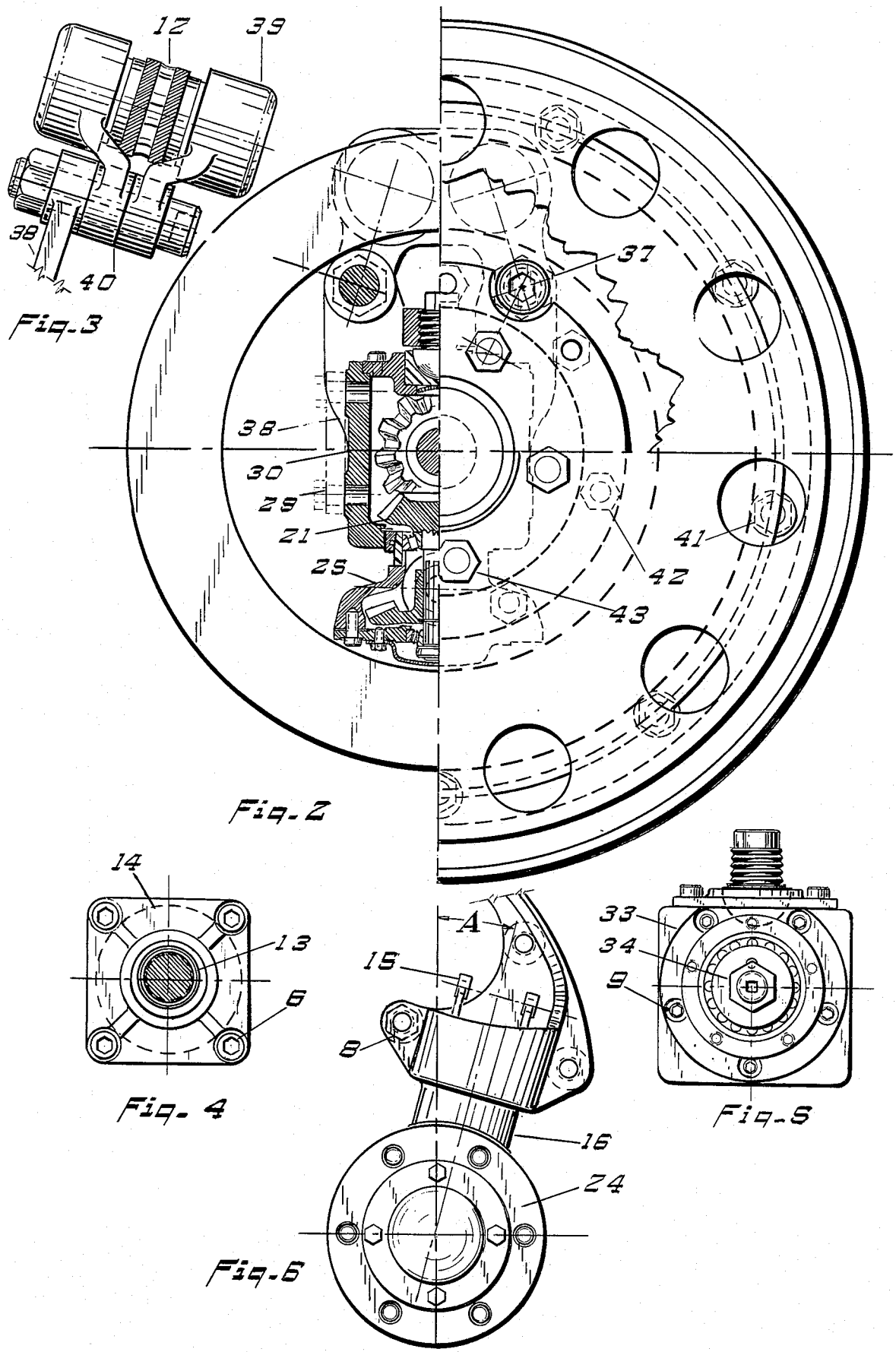

POWER DRIVEN CENTERLINE STEERING SAFETY AXLE WHEEL ASSEMBLY WITH DISC BRAKE

BACKGROUND, SUMMARY, AND OBJECTS OF THE INVENTION

It is desirable to provide surface vehicles, as for example, automotive vehicles—especially military and off-the-road equipment—with power to both front and rear wheels. It is also desirable that the front wheels, especially, of these kinds of vehicles, have disc brakes. This assembly provides both brakes and power in the confined space of a dirigible wheel.

The present application discloses a dirigible wheel with a disc brake, somewhat similar—but with significant modifications—to Inbody U.S. Pat. No. 3,963,260, dated June 15, 1976. However, the wheel disclosed in the present application is driven by power supplied to the wheel by a universal drive located on the vehicle. Various forms of front wheel driven automotive vehicles are known, as for example, that shown in Kost, et al. U.S. Pat. No. 2,817,407, dated Dec. 24, 1957. This last mentioned device has no brake of any kind. The assembly of the present application has the combination of power and brakes for both front wheels.

An object of the invention is to provide a new and improved power driven dirigible wheel and disc brake mechanism for all surface vehicles, as for example passenger automobiles, trucks, buses, tractors, all other land vehicles and aircraft landing gear, in which the steering axis of the wheel lies in the plane of the disc brake rotor on the wheel.

Another object is to provide a vehicle wheel mounted on a spindle which is rotatable in a hub, a brake rotor disc rotatable with the spindle, a brake caliper secured to the hub and a system of gears driving the spindle wherein the spindle, hub, brake rotor disc, brake caliper, and the system are all located within the confined space of the wheel.

Another object of the invention is to improve vehicular steering control in a power driven wheel by solving such problems as directional stability in a straight line or in cornering maneuvers, a sharper turning angle, and improved tractionability. This is possible because wheel alignment is set at zero degrees and the dragging or scrub forces are eliminated. Therefore, the device herein disclosed prevents a wedging effect common to conventional devices because the front wheels roll straight without toe-in or camber-adjusted angles. It should also be noted that fuel consumption is reduced because of these features in Centerline design. These features should be significant to the military forces in the event the enemy blows out a front tire. The driver will be able to control the vehicle at any speeds without losing a front tire from the wheel. The flat front tire provides the cushioning or buoyancy required to maintain directional control. The turning angle is no longer limited by U-joint angle restriction.

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure.

DESCRIPTION OF THE DRAWING

FIG. 2 is an elevational view of the wheel shown in FIG. 1, with portions broken away and parts in section.

FIG. 3 is an assembled view of the disc brake caliper with the support arms.

FIG. 4 is a cross section through the trunnion pin looking down at the pin retainer to show the bolt locations in the transmission housing.

FIG. 5 is a view of the end of the spindle with the speedometer and dust cap removed.

FIG. 6 is view of the bottom of the gear housing looking up from the inside of the rotor to show one means of attaching the drive pinion housing to the yoke flange.

DESCRIPTION OF PREFERRED EMBODIMENT OF THE INVENTION

Figure 1:
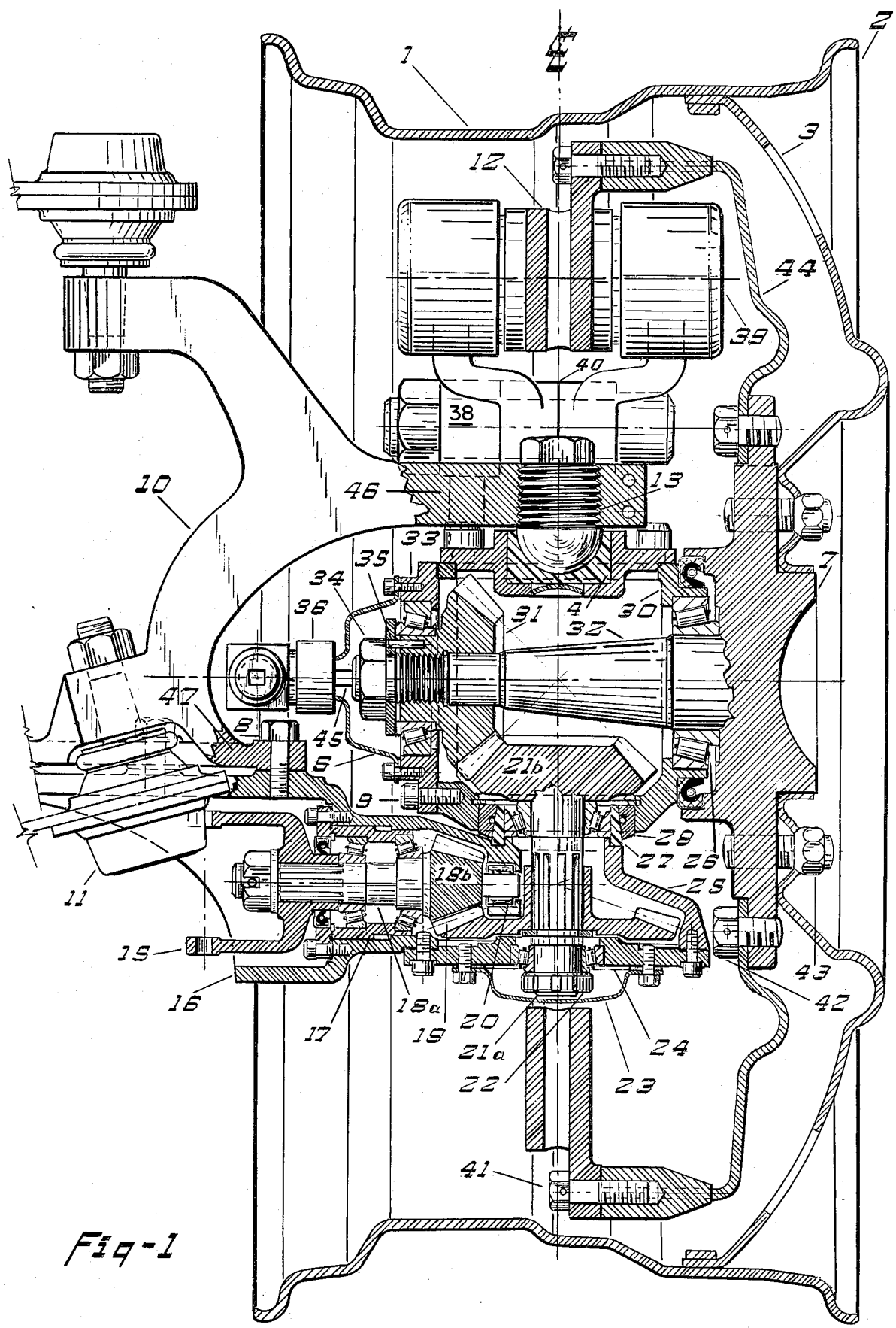
FIG. 1 is a view partly in section of the right, front dirigible wheel through the center of the yoke, trunnion and disc brake rotor.

In the preferred embodiment of the invention illustrated in FIGS. 1-6 we have shown dirigible wheel 1. This is the right front wheel of a surface vehicle, not shown, and it is to be understood that the other front wheel is identical in construction to the wheel 1 and, to avoid repetition, the left wheel is not shown. It is further understood that the wheel may be located elsewhere than at the front of the vehicle. The wheel has a tire retaining rim 2. Wheel spider 3 is secured to the wheel and is bolted to the flange 7. The wheel is supported on the yoke 10. The yoke is connected to elements 11 which are secured to the vehicle frame. The lower arm 47 of the yoke is bolted to pinion housing 16 by bolts 8. Pinion housing 16 and gear housing 25 are integral but may be separate castings welded together.

The wheel 1 pivots about the vertical center line CL shown in FIG. 1 and rotates with spindle 32. The spindle has an integral flange 7 to which the wheel is attached by attaching bolts 43. The wheel is supported to pivot about vertically aligned trunnion pin 13, in upper arm 46, and the bearing and tapered bushing 27, which is seated in gear housing 25. The trunnion pin rests in its bushing 4. The retainer 28 is seated in transmission housing 30 and rests on bushing 27. Thus retainer 28 is free to turn about tapered bushing 27. An O-ring in retainer 28 seals 27 and 28. The transmission housing 30 serves as a hub for the wheel. Yoke 10, pinion housing 16, and gear housing 25 are rigid. When the yoke is secured to the vehicle, as a unit, they are considered as functioning as a part of the vehicle main frame.

The trunnion pin 13, held fast in yoke 10, rests in bushing 4 which is held in trunnion pin retainer 14 (FIG. 4). Retainer 14 is secured to transmission housing 30 by bolts 6. This permits the wheel assembly to pivot about the trunnion pin. FIG. 6 shows one arrangement of bolt locations for yoke 10 and pinion housing 16. The degree of angle A will vary depending on the type of axle and/or kind of support with the vehicle main frame.

Power is delivered to U-joint yoke 15 from a power source on the vehicle. U-joint yoke 15 is secured to integral drive shaft 18a and pinion 18b which drives gear 19. Power continues to integral shaft 21a and gear 21b, to gear 31 and spindle 32 and flange 7 to which the wheel is bolted by bolts 43. Bevel gears are shown only for the purpose of illustration. Other suitable type gears or any combination thereof can be used for a drive mechanism.

The disc brake caliper 39 (FIG. 3) is bolted to the support arms 38 by anchor bolts 37. The cut out in the flange (FIG. 2) is for the installation of the anchor bolt. The support arms 38 are attached to transmission housing 30 as, for example, by welding. The caliper applies pressure to each side of the disc brake rotor 12 which is bolted to rotor flange 44 by attaching bolts 41. The rotor flange is bolted to spindle 32 by bolts 42. Provision is made so that the thickness of the rotor 12 can vary by machining the identical caliper halves to the required dimensions at the mating surfaces 40.

Drive shaft and pinion 18a, 18b and U-joint yoke 15 are assembled as a unit in pinion bearing cage 17. This assembly includes pinion, bearings, seals, shims and attaching means. The pinion needle bearing 20 is part of the gear housing 25. Drive gear 19 is splined to the shaft and gear 21a, 21b. The shaft bearing retainer 24 is bolted to the gear housing. This gear train, comprising drive gear 19 and shaft and gear 21a, 21b, is secured in place by a Timken lock nut 22. Dust cap 23 protects the assembly.

Gear 31 is supported on and is threaded to the spindle 32 to provide a means, during assembly, for obtaining proper tooth contact with gear 21b. The spindle and gear are also supported in the transmission housing 30 by bearing retainer 33, secured to the transmission housing by bolts 9. Gear 31 is held in position with gear 21b by lock pin 35. The washer under lock nut 34 has a hole in it for lock pin 35 so that when the nut is tightened the two gears are securely held in proper tooth contact.

Speedometer coupling 36 is driven by the rotation of the spindle 32 and is part of and held rigid by the dust cap 5 as these two components comprise a complete assembly. The drive shaft 45 for the speedometer is shown at the end of the spindle.

The wheel and rim configuration is typical and is not intended to represent any one manufacturer. The spindle, with the wheel, is supported in the housing 30 by flange bearing 26 and bearing retainer 33.

The steering arm bracket 29—shown in phantom (FIG. 2)—is bolted to the transmission housing 30. A similar bracket may be bolted on the opposite side of the transmission housing. One bracket connects with a steering mechanism and the opposite bracket connects with a tie-rod of the opposite wheel (not shown).

I claim:

1. A dirigible wheel assembly for a surface vehicle, comprising: a wheel member; a transmission housing; a rotatable wheel spindle journalled in said housing and having an annular flange extending radially from the outer end of said spindle; means supporting said housing for turning movement about a steering axis lying in a plane normal to the axis of rotation of said spindle and comprising a yoke member having an upper arm extending above said housing and a lower arm extending parallel to said upper arm; an integral pinion housing and gear housing secured to said lower arm, and said gear housing being sealed to said transmission housing; bearing means between said upper arm and said gear housing and forming a pivot for swinging said transmission housing about said steering axis, said wheel member being attached to said annular flange; an annular brake rotor attached to said annular flange and presenting annular brake shoe engaging surfaces lying in planes normal to the axis of rotation of said spindle; a brake caliper assembly having support arms attached to said transmission housing, said brake caliper assembly including brake shoes on both sides of said brake disc for pressing against said respective brake shoe engaging surfaces; a U-joint yoke for engagement with a source of power on the vehicle; a drive shaft and pinion journalled in said pinion housing and connected to the U-joint yoke; a shaft and first gear journalled in said gear housing with the said gear extending into said transmission housing; a drive gear secured to said shaft and first gear and meshing with said pinion; a second gear secured to the inner end of said spindle and meshing with said first gear to transmit power for rotating the wheel.

2. A dirigible wheel assembly as defined in claim 1 wherein said transmission housing includes means for connecting a steering mechanism and a tie-rod of the opposite wheel, and said yoke includes means for securing the wheel assembly to the frame of a surface vehicle.

3. A dirigible wheel assembly as defined in claim 1 wherein said transmission housing, said spindle, said brake rotor, said brake caliper assembly, said pinion and each of said gears are entirely inside the wheel within planes extending through the side edges of said wheel.

4. A dirigible wheel assembly for a surface vehicle comprising: a wheel; a transmission housing; a wheel spindle journalled in said housing; means securing said wheel to said spindle for rotation therewith; a yoke for attaching said wheel assembly to a surface vehicle and having upper and lower arms; an integral pinion housing and gear housing secured to said lower arm; bearing means supporting said transmission housing on said arms for turning movement about a vertical steering axis lying in a plane normal to the center line of said transmission housing and coincident with the vertical center line of said wheel; an annular brake rotor attached to said spindle and presenting annular brake shoe engaging surfaces lying in planes normal to the axis of rotation of said spindle; a brake caliper assembly having support arms attached to said transmission housing; said brake caliper assembly including brake shoes on both sides of said brake disc for pressing against said respective brake shoe engaging surfaces; a pinion having means for receiving power from a source of power on said vehicle; a gear within said transmission housing and secured to said spindle for rotation therewith; an interconnected gear assembly connected with said pinion and with said gear for rotating said spindle, wheel and brake rotor; and means for attaching said transmission housing to a steering system of said vehicle.

5. A dirigible wheel assembly for a surface vehicle as defined in claim 4 wherein said transmission housing, said pinion, and said gear assembly are between the upper yoke arm and the bottom of said pinion housing and gear housing and are entirely inside the wheel within planes extending through the side edges of said wheel, and wherein said brake rotor and said brake caliper assembly are also entirely inside the wheel within planes extending through the side edges of said wheel.

* * * * *